Figure 1:
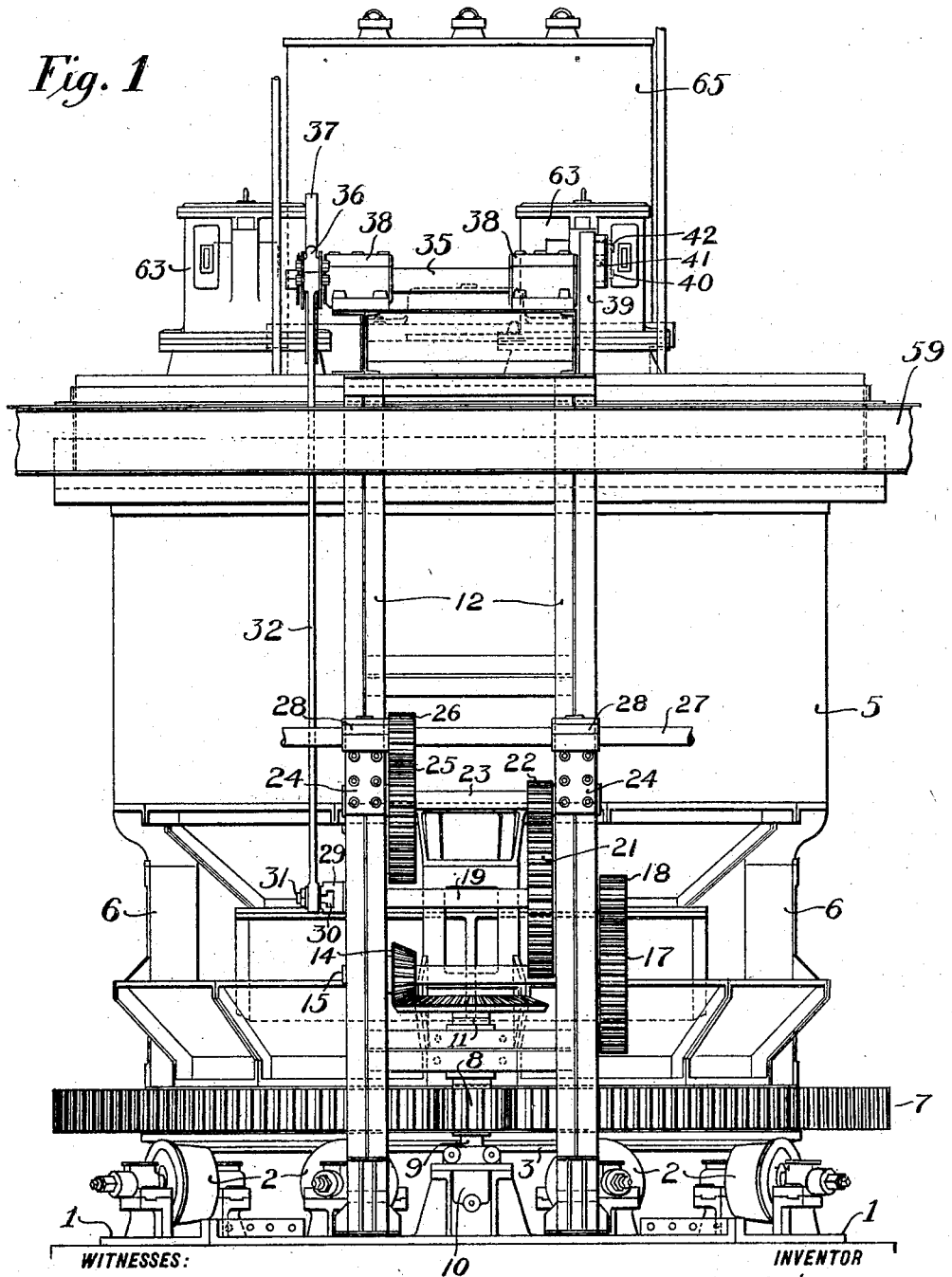

No. 795,835. PATENTED AUG. 1, 1905.
W. B. HUGHES.
GAS PRODUCER.
APPLICATION FILED OCT. 17, 1903.

2 SHEETS—SHEET 1.

WITNESSES:
INVENTOR
Wm. B. Hughes
BY
ATTORNEY.

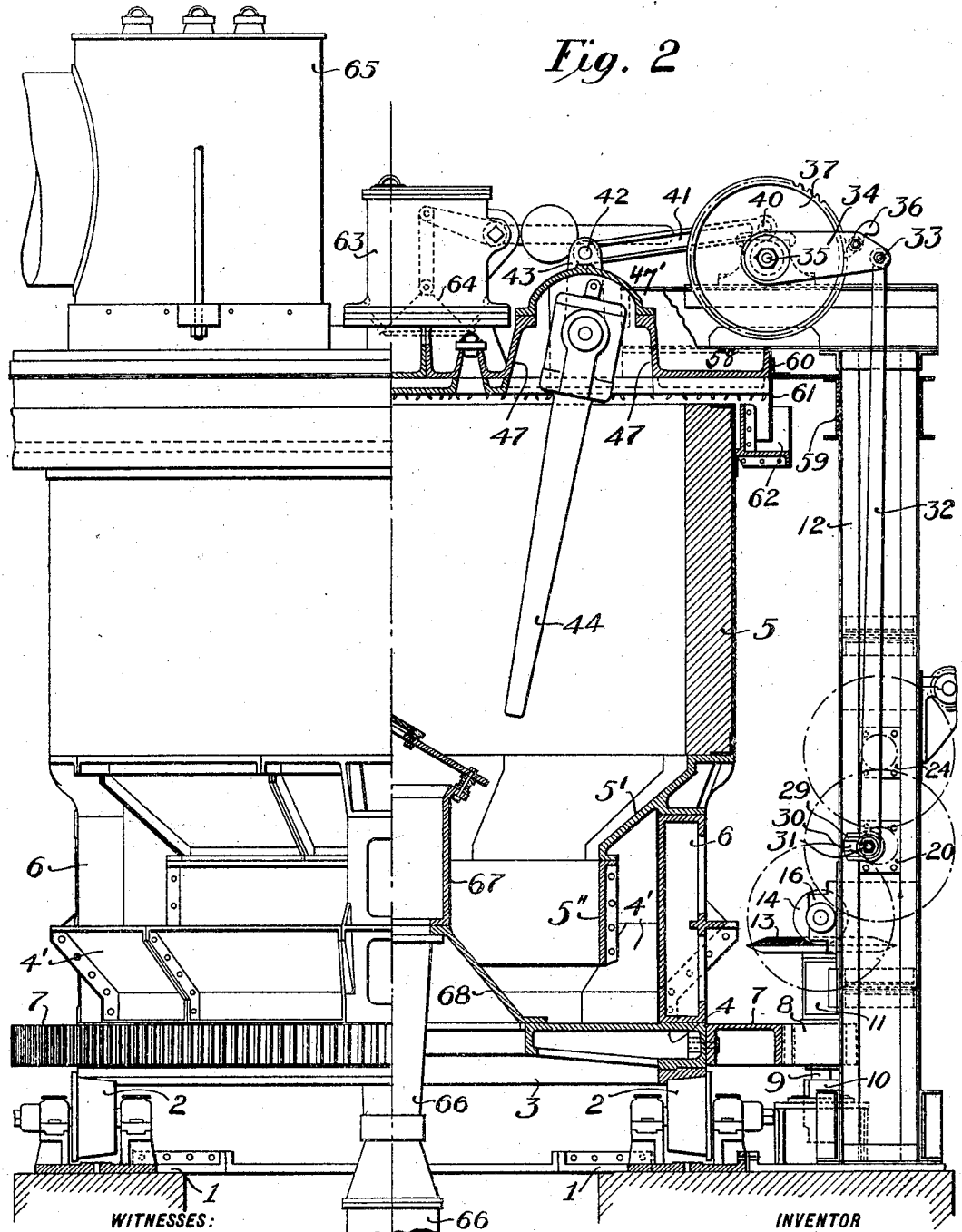

UNITED STATES PATENT OFFICE.

WILLIAM B. HUGHES, OF WISSAHICKON, PENNSYLVANIA.

GAS-PRODUCER.

No. 795,835.　　　　Specification of Letters Patent.　　　　Patented Aug. 1, 1905.

Application filed October 17, 1903. Serial No. 177,433.

*To all whom it may concern:*

Be it known that I, WILLIAM B. HUGHES, a citizen of the United States, residing at Wissahickon, in the county of Philadelphia and State of Pennsylvania, have invented certain Improvements in Gas-Producers, of which the following is a specification.

This invention relates more particularly to a gas-producer having improved mechanism for distributing and stirring the fuel, sealing the producer-body, and collecting the gas.

The nature and characteristic features of the improvements will more fully appear by reference to the following description and the accompanying drawings in illustration thereof, of which—

Figure 1 represents an elevation of a gas-producer embodying the improvements. Fig. 2 represents an elevation thereof, partially in section, at right angles to the position shown in Fig. 1.

As shown in the drawings, the foundation 1 supports a series of circularly-arranged rollers 2, which provide bearings for the circular track 3, fixed to the base 4 of the revoluble gas-producer body 5, the body being an integral construction supported upon and fixed to the base by the struts 6. To effect the revolution, a circular gear or rack 7 is fixed to the base and engaged by a pinion 8, fixed on a revoluble shaft 9, the latter being journaled in the bearing 10, supported by the foundation, and the bearing 11, supported by the stationary struts 12, carried by the foundation. A bevel-gear 13, fixed on the shaft 9, is engaged and driven by a bevel-pinion 14, fixed on a revoluble shaft 15, journaled in bearings 16 on the stationary struts. The shaft 15 has a spur-wheel 17 fixed thereon, which is engaged and driven by a pinion 18, fixed on a shaft 19, journaled in bearings 20 on the stationary struts. The shaft 19 has fixed thereon the spur-wheel 21, which is engaged and driven by a pinion 22, fixed on the shaft 23, the latter being journaled in the bearings 24 on the stationary struts. The shaft 23 has fixed thereon the spur-wheel 25, which is engaged and driven by the pinion 26, fixed on the driving-shaft 27, the latter being journaled in the bearings 28.

A crank 29, fixed on the shaft 19, has therein the dovetailed guideway 30, in which the base of the crank-pin 31 is engaged, the engagement permitting the movement of the pin for the regulation of its throw. Connected with and reciprocated by this crank-pin is a link 32, having the pivotal connection 33 with the rocking lever 34. This lever is carried by the shaft 35 and carries the gravity-pawl 36, adapted to engage and advance a ratchet-wheel 37, fixed to the shaft, the latter being journaled in the fixed bearings 38, carried by the struts 12. The shaft 35 has thereon the crank 39, provided with a pin 40, pivotally connected to a link 41, the latter having the pivotal connection 42 with the crank 43 for oscillating the poker 44.

The housing 47, having the cap 47', by which a tight inclosure of the oscillating poker is provided, is a part of the fixed producer top or cover 58, which is supported by the framework 59. This top is provided with the upwardly-projecting flange 60 to hold water for cooling purposes and with the downwardly-projecting flange or apron 61, which dips into a channel 62, surrounding the top of the producer-body, to provide a water seal for preventing the escape of gas between the fixed top and movable body.

The fuel-inlets 63, having the bell-valves 64 therein, are arranged on opposite sides of the top between the center and periphery, and the gas take-off or outlet 65 is removed therefrom, being likewise located between the center and the periphery. The poker is also journaled in the top at any point from the center to the periphery opposite to the take-off.

The bottom of the producer-body comprises the conically-contracted section 5' and the cylindrical section 5'', providing a hopper having a shoulder which holds the fuel and obviates the packing of the ashes. The lower portion of the hopper is open to provide a free vertical passage and dips into a bowl or basin 4', fixed to the base 4, the bowl receiving the ashes and holding water for sealing the hopper.

The blast-pipe 66 is carried upward centrally through the bottom of the ash pit or bowl to the dome or blast-box 67, supported thereon by the pedestal 68.

It will now be understood that when the train of gears is operated the cylindrical producer-body, blast-box, and ash-pit are revolved together, while the poker is slowly oscillated in its bearings in the stationary cover, cutting the distilling material radially and annularly. The fuel fed through the inlets therefor is uniformly distributed over the surface of the body of distilling coal by reason of the location of the inlets and the action of the poker. The gas escaping does not in the usual manner sweep through the coal being admitted and carry particles thereof into the take-off, as has been an objectionable feature heretofore. The exterior location of the seal between the top and body prevents water from being thrown into the distilling fuel by explosions of gas. The revolution together of the ash-hopper and ash-pit avoids churning and packing the ashes, while carrying the same to the point where they can be removed most advantageously.

Having described my invention, I claim—

1. A gas-producer having a casing horizontally divided at or near the top, one portion of the casing being revoluble, an inlet in said top which distributes fuel in a circular path around the axis of rotation, and an oscillating poker which cuts across the fuel throughout the path in which it is deposited, substantially as specified.

2. A gas-producer comprising a revoluble body, an ash-hopper fixed to and depending from said body, said hopper having a conical section and an open cylindrical section providing a shoulder for supporting the fuel and a free outlet for the ashes, a stationary top above and covering said body, an oscillating poker supported by said top, and mechanism connecting said poker with said body and hopper for oscillating said poker and revolving said body and hopper in unison, substantially as specified.

3. A gas-producer comprising a revoluble body having an ash-hopper consisting of a conical section and a cylindrical section providing a shoulder for supporting the fuel and a free outlet for the ashes, an ash and sealing pit fixed to and revoluble with said body, means for revolving said body, and a stationary top having an inlet discharging eccentrically to the axis of rotation of said revolving body whereby fuel is distributed in said body, substantially as specified.

4. A gas-producer having a revoluble body, a stationary top, an inlet in said top which distributes fuel in a circular path around the axis of rotation of said body, and an oscillating poker which cuts across the fuel throughout the path in which it is deposited and sweeps the same toward the axis, substantially as specified.

5. In a gas-producer, a body, a cover for said body, a poker journaled in bearings carried by said cover, a crank connected with said poker, a pawl-and-ratchet mechanism carried by said cover, a crank connected with said pawl-and-ratchet mechanism, a link connecting said cranks, and mechanism for reciprocating said link, substantially as specified.

6. In a gas-producer, a revoluble body having an ash-pit fixed thereto, a stationary top for said body, a poker journaled within a housing carried by said top, a crank connected with said poker, a ratchet-wheel, mechanism connecting said crank and ratchet-wheel, an oscillating lever having a pawl engaging said ratchet-wheel, a gear-train for revolving said body, and mechanism connecting said gear-train with said oscillating lever to oscillate said poker, substantially as specified.

In testimony whereof I have hereunto set my hand, this 12th day of October, A. D. 1903, in the presence of the subscribing witnesses.

WM. B. HUGHES.

In presence of—
THOMAS S. GATES,
UTLEY E. CRANE, Jr.